United States Patent [19]

Ohtake et al.

[11] Patent Number: 4,903,135
[45] Date of Patent: Feb. 20, 1990

[54] AUTOMATIC FOCUSING SYSTEM

[75] Inventors: Yoshichi Ohtake, Kamakura; Kaichiro Nomoto, Tokyo; Takashi Shinozaki, Yokohama, all of Japan

[73] Assignee: Victor Company of Japan, Ltd., Yokohama, Japan

[21] Appl. No.: 352,629

[22] Filed: May 15, 1989

Related U.S. Application Data

[63] Continuation of Ser. No. 103,637, Oct. 2, 1987, abandoned.

[30] Foreign Application Priority Data

Oct. 2, 1986 [JP] Japan ................................ 61-235238
Feb. 24, 1987 [JP] Japan ................................ 62-40538

[51] Int. Cl.$^4$ ........................................... H04N 5/232
[52] U.S. Cl. ..................................... 358/227; 354/402
[58] Field of Search ................ 358/227, 225; 354/402, 354/406, 407, 408

[56]  References Cited

U.S. PATENT DOCUMENTS

| | | | |
|---|---|---|---|
| 4,609,944 | 9/1986 | Nakada et al. | 358/228 |
| 4,621,292 | 11/1986 | Hirao et al. | 358/227 |
| 4,706,124 | 11/1987 | Baba et al. | 358/227 |
| 4,717,959 | 1/1988 | Isago | 358/227 |
| 4,762,986 | 8/1988 | Suda et al. | 250/201 |

FOREIGN PATENT DOCUMENTS 2948752 6/1980 Fed. Rep. of Germany .
212071 10/1985 Japan .

OTHER PUBLICATIONS

IEEE Transactions on Consumer Electronics, vol. CE-29, No. 3, Aug. 1983, pp. 376-382, IEEE, New York, U.S.; K. Hanma et al.: "Novel Technologies for Automatic Focusing and White Balancing of Solid State Color Video Camera".

*Primary Examiner*—James J. Groody
*Assistant Examiner*—Robert M. Bauer
*Attorney, Agent, or Firm*—Pollock, VandeSande & Priddy

[57]  ABSTRACT

An automatic focusing apparatus having a focusing lens system and an image pickup device for converting a light beam incident thereon into the corresponding electrical signal. The automatic focusing apparatus is arranged so that focusing is performed in accordance with the focus voltage obtained from a predetermined high-frequency component of the electrical signal, on the basis of the fact that the level of the focus voltage corresponds to the sharpness of the resultant image. The focus voltage is successively compared with each of a plurality of reference voltages predetermined to be increased in steps. The focusing lens system is controlled in position in accordance with a comparison between the first reference voltage agreeing with one of the focus voltages and the second reference voltage agreeing with another focus voltage so that the focusing lens system approaches the focus position. When the first and second reference voltages are equal in level to each other, the focusing lens system is controlled to take the middle point between the position corresponding to the first and second reference voltages.

3 Claims, 9 Drawing Sheets

AUTOMATIC FOCUSING SYSTEM

BACKGROUND OF THE INVENTION

The present invention relates generally to automatic focusing systems, and is applicable particularly, but not exclusively, to video cameras.

Known is an automatic focusing system of a video camera which is based on the fact that the voltage level of a high-frequency component of the image signal corresponds to the degree of sharpness of the resultant image and in which the focusing control is performed so that the voltage derived as a focus voltage assumes the maximum level to bring the focus lens into the focus position. Such an automatic focusing system is disclosed, for example, in "NHK TECHNICAL RESEARCH REPORT", vol. 17 (No. 1), published in 1965, or "TELEVISION ACADEMY TECHNICAL REPORT ED", published in 1982 (November), wherein two focus voltages obtained in accordance with movement of the focusing lens in one direction along its optical axis are successively sampled and compared in level with each other and on the basis of a result of the comparison the focusing lens is controlled so as to take the focus position with respect to an object. Generally, in accordance with the movement of the focusing lens, the focus voltage is varied in level so as to draw a curve similar substantially to Gauss' curve with respect to the maximum focus voltage obtained when the focusing lens takes the focus position. Thus, the rate of change of the focus voltage level is not constant, that is, the rate of change is apt to be decreased in the lower level region and further in the higher level region. This provides a problem in that because the difference in level between the two focus voltages becomes too small in the lower and higher level regions, difficulty is encountered to accurately measure the difference between the two focus voltage levels and hence to insure high reliability in the automatic focusing control.

SUMMARY OF THE INVENTION

It is therefore an object of the present invention to provide a new and improved automatic focusing system which is capable of accurately and surely perform the automatic focusing operation irrespective of the variation of the focus voltage in which the rate of level change is decreased as the focusing lens system approaches the focus position.

In accordance with the present invention, there is provided an automatic focusing system including a focusing lens system and an image pickup device for converting a light beam incident thereon from an object through the focusing lens system into the corresponding electrical signal, comprising: filter means coupled to the image pickup device for deriving a predetermined high-frequency component from the electrical signal; detector means coupled to the filter means for detecting a focus voltage of the derived predetermined high-frequency component, the level of the focus voltage being varied in accordance with the position of the focusing lens system so as to assume the maximum when the focusing lens system takes the focus position; drive means for driving the focusing lens system in directions along its optical axis; and control means coupled to the detector means for successively comparing the focus voltage with each of a plurality of reference voltages determined to be increased in steps and coupled to the drive means for controlling the drive means in accordance with the result of the comparison so that the focusing lens system takes the focus position with respect to the object.

The automatic focusing apparatus is arranged so that focusing is performed in accordance with the focus voltage obtained from a predetermined high-frequency component of the electrical signal, on the basis of the fact that the level of the focus voltage corresponds to the sharpness of the resultant image. The focus voltage is successively compared with each of a plurality of reference voltages predetermined to be increased in steps. The focusing lens system is controlled in position in accordance with comparison between the first reference voltage agreeing with one of the focus voltages and the second reference voltage agreeing with another focus voltage so that the focusing lens system approaches the focus position. When the first and second reference voltages are equal in level to each other, the focusing lens system is controlled to take the middle point between the position corresponding to the first and second reference voltages.

Preferably, the automatic focusing apparatus further comprises gain control circuit means which is provided between the filter means and the detector means and which is arranged so that its gain is controlled stepwise to be decreased by a predetermined value in accordance with a gain control signal from the control means whereby the focus voltage is kept in a predetermined range, and wherein the control means controls the difference in level between the plurality of reference voltages so as to be varied stepwise in accordance with the amount of the gain determined in the gain control. It is also preferred that the automatic focusing apparatus of the control means amplifies the focus voltage so that the amplification degree is determined in accordance with the amount of the gain in the gain control.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
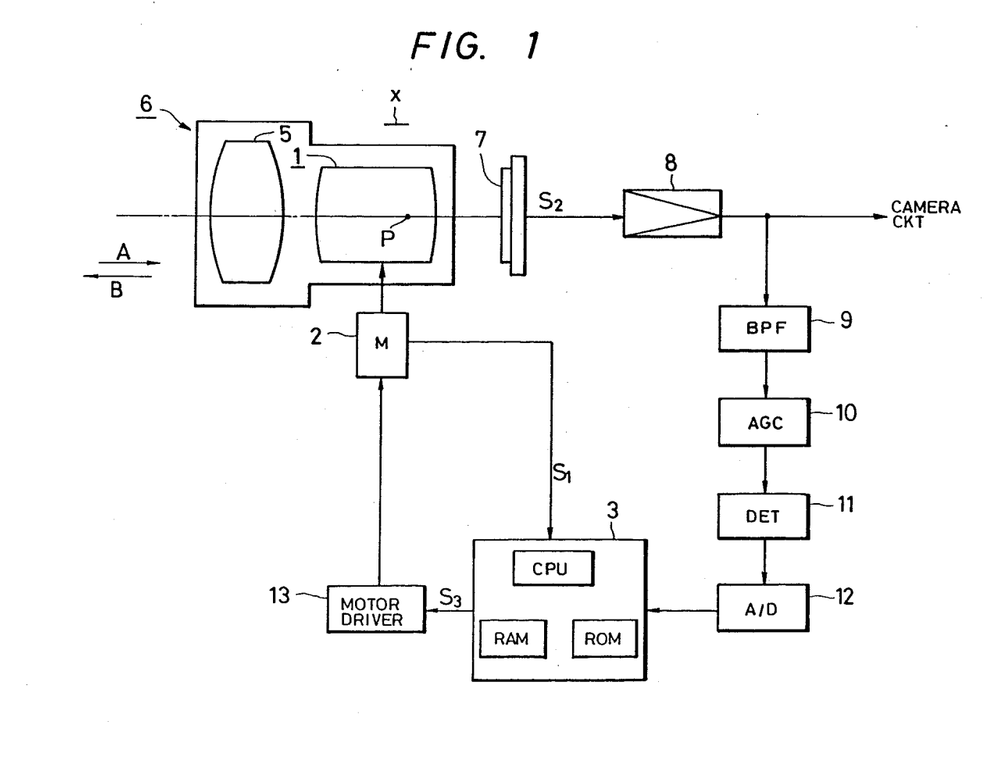
FIG. 1 is a block diagram showing a first embodiment of an automatic focusing apparatus according to the present invention.
Figure 2:
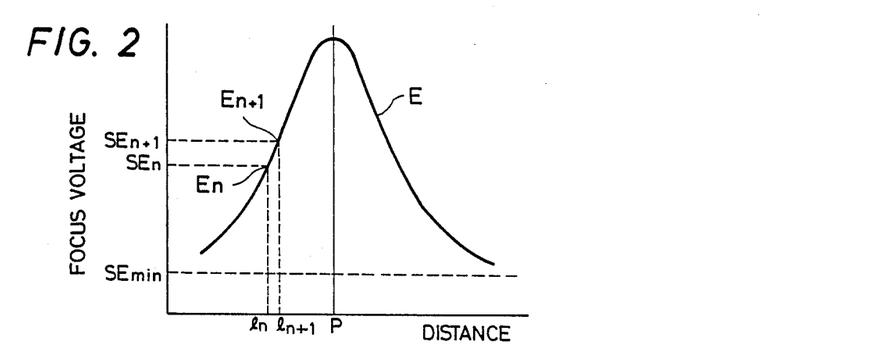
FIGS. 2 to 4 are illustrations for describing the relationship between the focus voltage and the reference voltages.

Referring now to FIG. 1, there is illustrated a first embodiment of an automatic focusing apparatus according to the present invention which is incorporated into a video camera. The automatic focusing apparatus includes an optical lens system 6 comprising an afocal lens system 5 and a focusing lens system 1 and is arranged so as to perform the focusing operation by moving the focusing lens system 1 in directions along the optical axis, i.e., the directions indicated by arrows A and B in the figure by means of a pulse motor 2. The focusing lens system 1 may be arranged to be moved up to the maximum when an object to be taken is at infinity focus. The pulse motor 2 is driven in response to the start of focusing operation and the position of the focusing lens 1 on the optical axis is detected by a rotary encoder, not shown, attached to the pulse motor 2 and a position indicating signal S1 from the rotary encoder is supplied to a microcomputer 3. On the other hand, a light beam having optical information relating to an object taken by the video camera reaches an image pickup device (CCD) 7 after being passed through the optical lens system 6, the image pickup device 7 generating an electrical signal S2 corresponding to the optical information by means of optoelectric conversion. The generated signal S2 is amplified by an amplifier 8 and supplied to a camera circuit, not shown, and further to a band-pass filter (BPF) 9. The band-pass filter 9 derives a predetermined high frequency component from the signal S2 and the derived high-frequency component is supplied to an automatic gain control circuit (AGC) 10 where the output of the band-pass filter 9 is kept below a predetermined level, before being supplied to a detector (DET) 11 which produces a focus voltage corresponding to the high-frequency component of the signal S2. The focus voltage is varied as indicated by E in FIG. 2 in accordance with the movement of the focusing lens system 1 from end to end. Here, the level of the focus voltage corresponds to the degree of sharpness of the reproduced image and is peaked when the focusing lens system 1 is at the focus position P. The focus voltage E is supplied to the microcomputer 3 after being passed through an analog-to-digital converter (A/D) 12.

The microcomputer 3, comprising a central processing unit (CPU), a random access memory (RAM), read only memory (ROM) and so on, performs successively sampling operation of the focus voltage E at every field of the signal S2 and compares the sampled focus voltage E with a plurality of reference voltages. The plurality of reference voltages is determined to be stepped up by a predetermined level with respect to the minimum level SEmin which depends upon the performance of the detector 11 or the analog-to-digital converter 12. When a sampled focus voltage En substantially becomes equal in level to one reference voltage SEn, the microcomputer 3 stores the reference voltage SEn and the position ln of the focusing lens system 1 on the basis of the signal S1 and when another sampled focus voltage En+1 substantially becomes equal in level to another reference voltage SEn+1, the microcomputer 3 subsequently stores the reference voltage SEn+1 and the position ln+1 thereof on the basis of the signal S1. The microcomputer 3 compares the reference voltage SEn with the reference voltage SEn+1 and controls the focusing lens system 1 in position in accordance with the result of the comparison. More specifically, when SEn+1 is larger than SEn, the microcomputer 3 continues to supply a control signal S3 through a motor drive circuit 13 to the pulse motor 2, so that the focusing lens system 1 is further moved in the same direction and the focus voltage is increased. This is based on the fact that the focus voltage assumes the maximum value when the focusing lens system 1 takes the focus position. Here, it is also appropriate that a code is given to each of the plurality of the reference voltages and the comparison between the codes is performed instead of the comparison between SEn and SEn+1 in level. This will result in simplification of the focus position searching operation.

Figure 3:
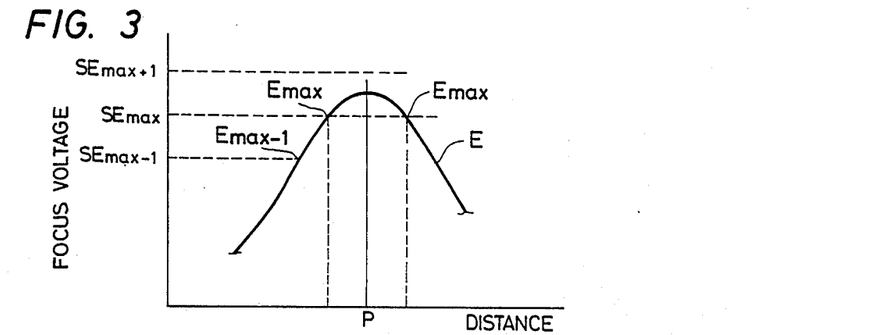
Figure 4:
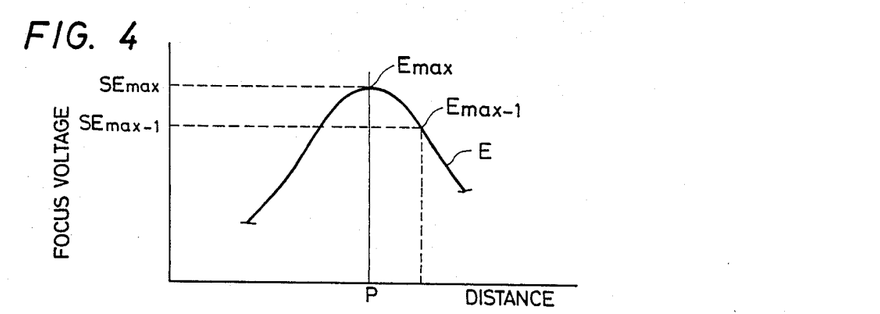

On the other hand, because the focus voltage E is varied so that it assumes maximum level when the focusing lens system 1 takes the focus position P as described above, as shown in FIG. 3, the focus voltage E successively becomes equal to two times to the highest reference voltage SEmax, i.e., the closest reference voltage to the maximum value of the focus voltage E when the focusing lens system passes through the focus position P. In this case, it is obvious that the focus position P of the focusing lens system 1 is at the middle point between the position corresponding to the first reference voltage SEmax and the position corresponding to the second reference voltage SEmax. Therefore, when SEn=SEn+1, i.e., Emax=SEmax, the focusing lens system 1 is moved back to the middle point to take the focus position P. In the case that, as shown in FIG. 4, the highest reference voltage SEmax is equal to the maximum value of the focus voltage E, the focus voltage (Emax) becomes equal to the highest reference voltage SEmax before the focus voltage (Emax−1) becomes equal to a reference voltage SEmax−1 which is lower in level than Emax without further becoming equal to SEmax. Therefore, when the focus voltage abruptly becomes equal to a reference voltage which is lower in level than the previous reference voltage, the focusing lens system 1 is moved back up to the position corresponding to the highest reference voltage SEmax whereby the focusing lens system 1 can be brought into the focus position.

For a better understanding, the above-mentioned focus position searching operation in the first embodiment of the present invention will further be described hereinbelow with reference to a flow chart of FIGS. 5A and 5B. This focus position searching routine begins with a step 100 to start moving the focusing lens system 1 in one direction along the optical axis. Concurrently with the movement of the focusing lens system 1, the microcomputer 3, in a step 102, reads a focus voltage E and, in a step 108, compares an obtained focus voltage with each (SEn) of a plurality of reference voltages which are predetermined and prestored in the ROM of the microcomputer 3. If the obtained focus voltage is not equal to any of the reference voltages, the microcomputer 3 similarly compares the next obtained focus voltage with each of the plurality of reference voltages. If becoming equal to the reference voltage SEn of the plurality of the reference voltages, the microcomputer 3 stores the reference voltage or the code corresponding to the reference voltage SEn in a register A1 and further stores in a register B1 the position S1n of the focusing lens system 1 at the time in a step 110. Thereafter, in a step 112 the microcomputer 3 reads the next focus voltage E and compares a newly obtained focus voltage with each SEn of the plurality of reference voltages in a step 118. If being equal to the reference voltage SEn, control advances to a step 120 where the microcomputer 3 stores the reference voltage SEn or the code corresponding to the reference voltage at the time and further stores the position S1n of the focusing lens system 1 in registers A2 and B2, respectively. A subsequent step 122 is executed in order to perform a comparison between the reference voltages stored in the registers A1 and A2 and check the relationship in level therebetween. If the value of A1 is equal to the value of A2, a step 124 follows to move the focusing lens system 1 to the middle point between the positions corresponding to the values B1 and B2 so that the focusing lens system 1 takes the focus position. If the reference voltage in the register A1 is greater than the reference voltage in the register A2, control goes to a step 126 to reverse the moving direction of the focusing lens system 1 and returns to the step 102. If the reference voltage in the register A1 is lower than the reference voltage in the register A2, the reference voltage in the register A2 and the position in the register B2 are shifted into the registers A1 and B1, respectively, in a step 128, followed by steps 130 through 140 which correspond to the above-mentioned steps 112 through 122, the description thereof being omitted for brevity. If the reference voltage in the register A1 is equal to the reference voltage in the register A2 in the step 140, control goes to the step 124. If A1<A2, the operational flow returns to the step 128. If A1>A2, control goes to a step 142 where the focusing lens system 1 is moved back up to the position corresponding to the value in the register B1 under the decision that the previously stored reference voltage is equal to the maximum value of the focus voltage.

In order to avoid the requirement of an analog-to-digital converter and a detector with high performance, it is preferred that the focus voltage is compressed by the gain shift process to be in a predetermined level range. The compression of the focus voltage provides one problem, however, which relates to generation of a swing between a focus condition and a defocus condition in the reproduced image because the rate of change of the focus voltage becomes too small in the vicinity of the focus position of the focusing lens system 1 and hence the returning distance of the focusing lens system 1 between the focus position P and the SEmax position becomes longer. A second embodiment of the present invention relates to an automatic focusing apparatus which is capable of removing this problem inherent to the compression of the focus voltage.

Figure 6:
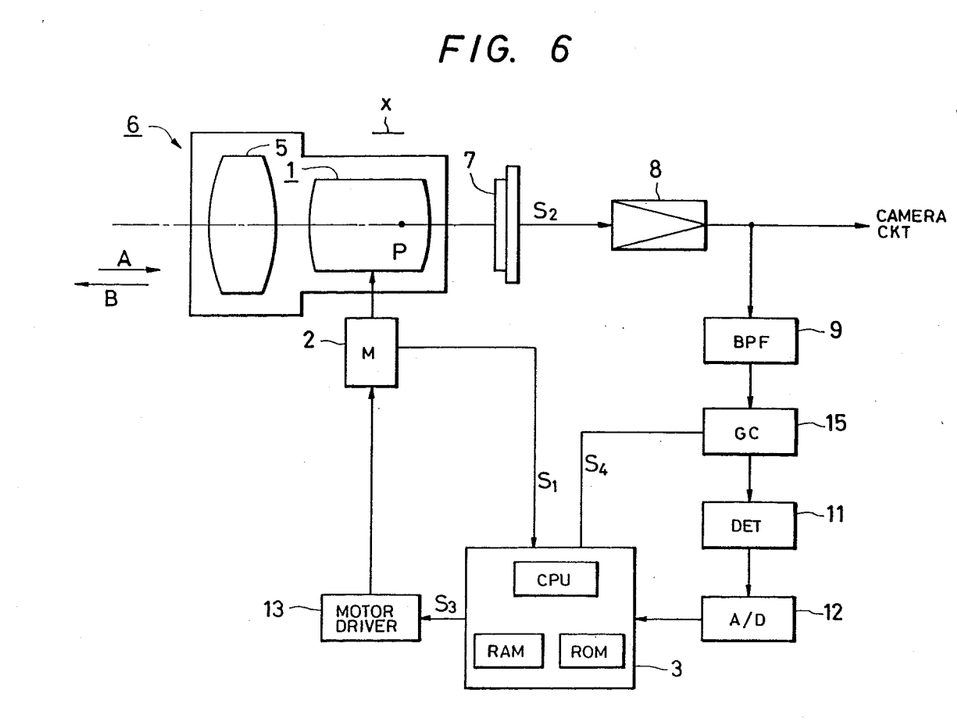
FIG. 6 is a block diagram showing second and third embodiments according to the present invention.
Figure 7:
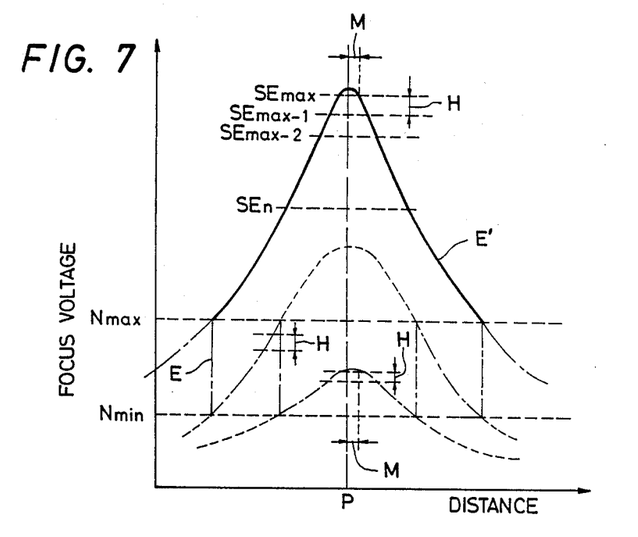
FIGS. 7 and 8 are illustrations for describing the second and third embodiments.

FIG. 6 is an illustration of an arrangement of the second embodiment in which parts corresponding to those in the FIG. 1 first embodiment are marked with the identical numerals and characters and the detailed description thereof will be omitted for brevity. In FIG. 6, the second embodiment similarly includes an optical lens system 6 comprising an afocal lens system 5 and a focusing lens system 1 which is moved along the optical axis by means of a pulse motor 2 for the focusing operation. The position of the focusing lens system 1 is detected by means of a rotary encoder, not shown, attached to the pulse motor 2. A signal S1 indicative of the position of the focusing lens system 1 is supplied from the rotary encoder to a microcomputer 3 comprising central processing unit (CPU), a random access memory (RAM), a read only memory (ROM) and so on. The pulse motor 2 is by a motor drive circuit 4 which is controlled in accordance with a control signal S3 from the microcomputer 3. On the other hand, a light beam having optical information relating to an object taken by the video camera reaches an image pickup device 7 after being passed through the optical lens system 6. The image pickup device 7 generates an electrical signal S2 which is in turn supplied through an amplifier 8 to a camera circuit of the video camera and further to a band pass filter (BPF) 9. The band-pass filter derives a predetermined high-frequency component from the output signal S2 of the image pickup device 7. The output signal of the band-pass filter 9 is supplied to a gain control circuit (or gain selector) 15 which is arranged such that the gain is controlled in accordance with a gain control signal S4 from the microcomputer 3. The gain of the gain control circuit 15 is shifted stepwise to be decreased by a predetermined value so that the output signal (focus voltage E) of a detector 11 coupled to the gain control circuit 15 is kept in a predetermined range having the upper limit Nmax and the lower limit Nmin as indicated by alternate long and short dash lines in FIG. 7, a solid line in FIG. 7 representing the focus voltage E' in the case of no gain control. Here, the gain control is performed in steps so that in response to reaching the upper limit Nmax of the predetermined range, the focus voltage is reduced to the lower limit Nmin. The focus voltage E is supplied through an analog-to-digital converter 12 to the microcomputer 3 so as to be compared with a plurality of reference voltages for the focus position searching operation. An important point in the second embodiment is that the difference in level between the successive two of the plurality of reference voltages is determined so that the difference is set to become larger when the gain is high and the difference is set to become smaller when the gain is low. That is, the reference voltages are controlled as shown in FIG. 7 wherein the difference H in level therebetween is smaller in the region that the rate of change of focus voltage level is lower, i.e., in the vicinity of the focus position P of the focusing lens system 1. As a result of the control of the difference H, the returning distance M is shortened to prevent the swing between the focus and defocus conditions due to the returning of the focusing lens system 1 to the focus position P.

Figure 8:
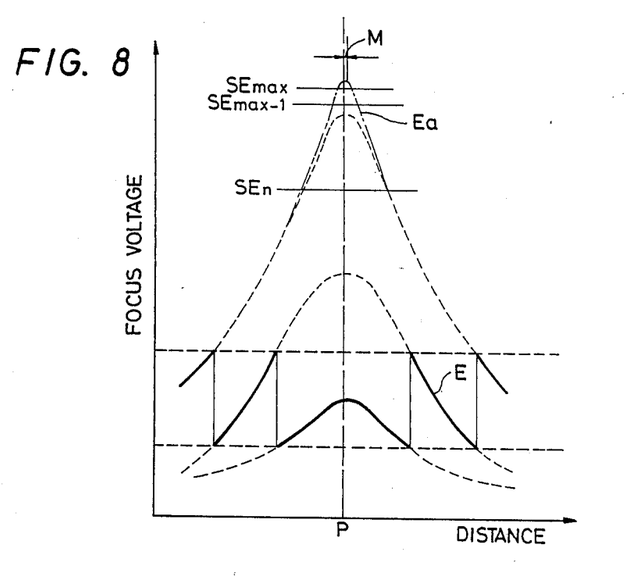

Although in the second embodiment the difference H is controlled in order to shorten the returning distance M, it is also appropriate that the compressed focus voltage is expanded to be restored to the original voltage and is amplified in accordance with the gain so as to be obtained as indicated by Ea in FIG. 8. In this case, the returning distance M is also shortened without controlling the difference H. A third embodiment of an automatic focusing system according to the present invention is based on the following fact. That is, the microcomputer 3 amplifies (multiplies) the compressed focus voltage in at least the lowest gain condition to the original voltage, whereby the rate of change of the focus voltage in level becomes increased in the vicinity of the focus position P so that the returning distance M is shortened to prevent the swing between the focus and defocus conditions. Since a circuit arrangement of the third embodiment is similar to that of the second embodiment with the exception of the amplification of the focus voltage, the description thereof is omitted for brevity.

Figure 5A:
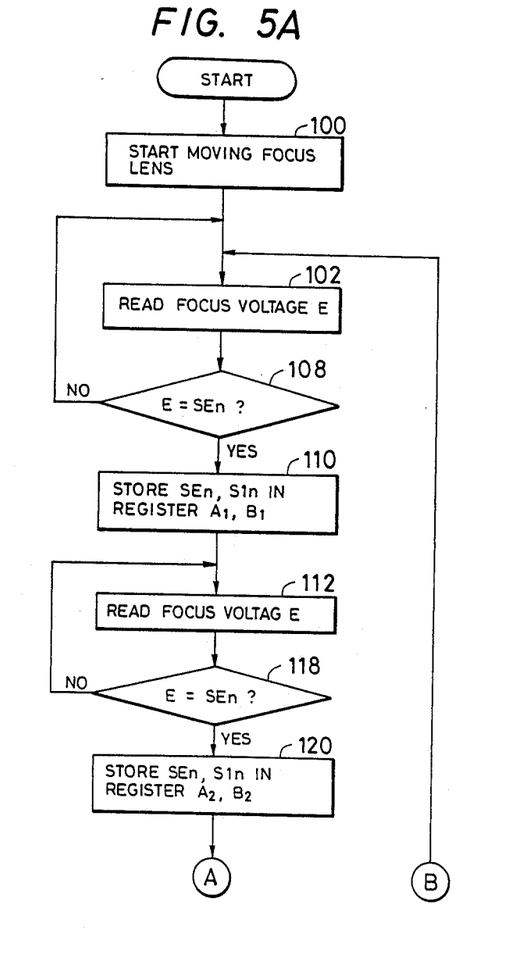
FIGS. 5A and 5B are flow charts showing a microcomputer's operation executed in the first embodiment.
Figure 5B:
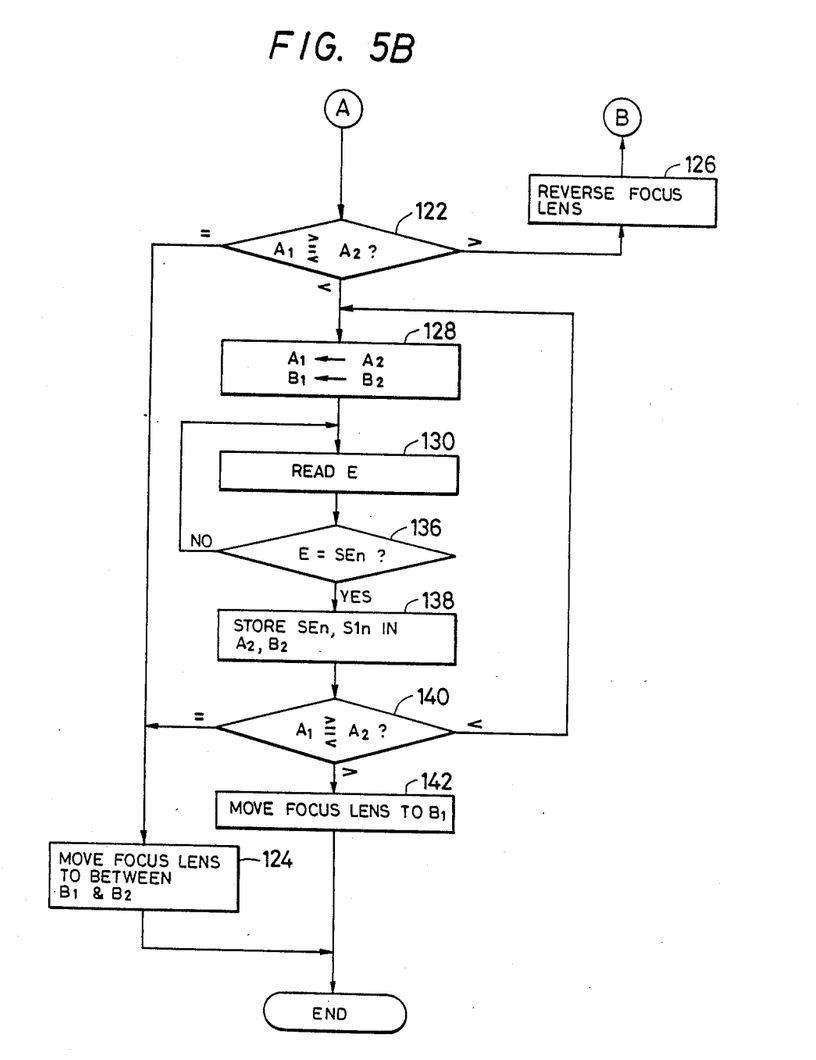
Figure 9A:
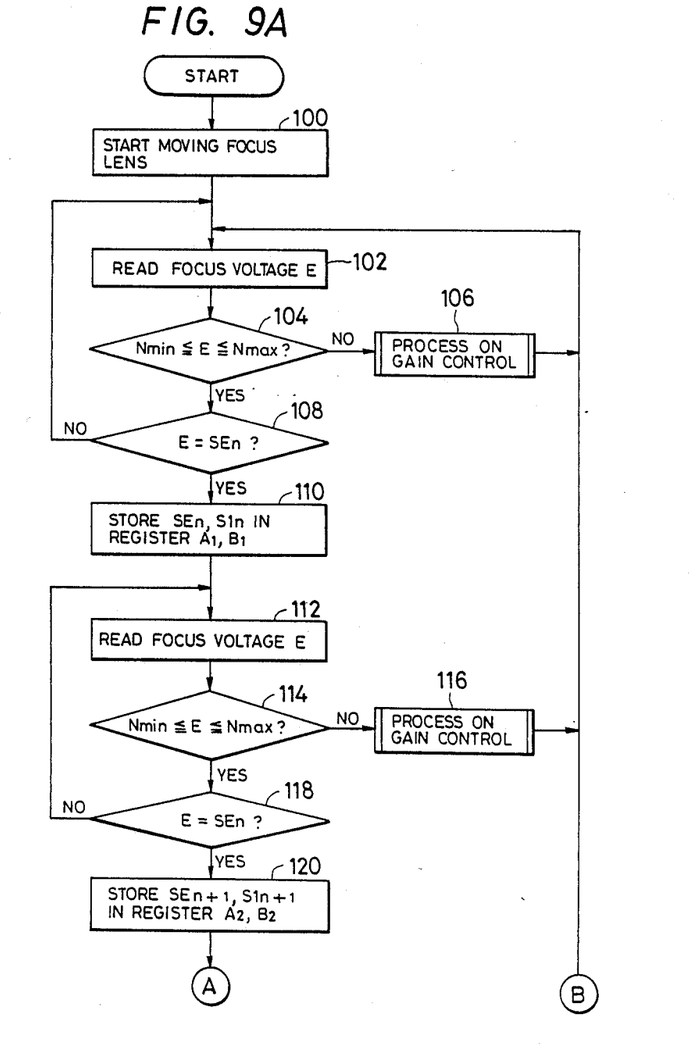
FIGS. 9A, 9B and 10 are flow charts showing the processes executed in the second and third embodiments.
Figure 9B:
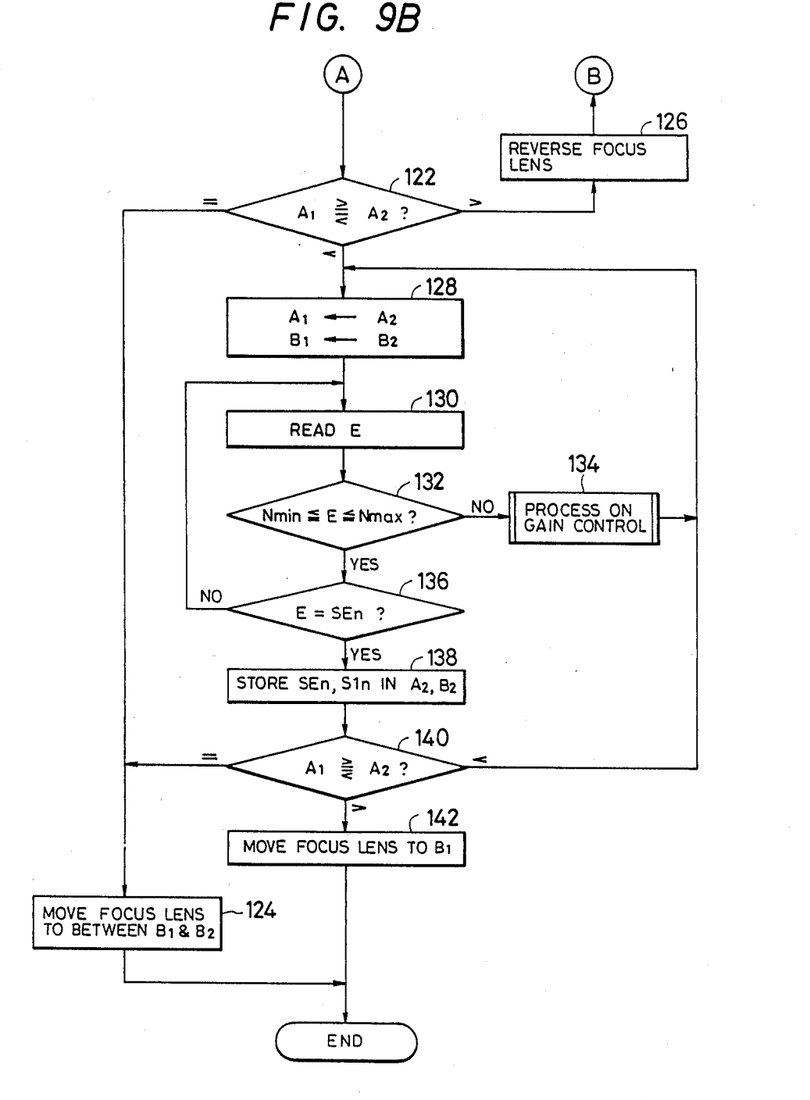
Figure 10:
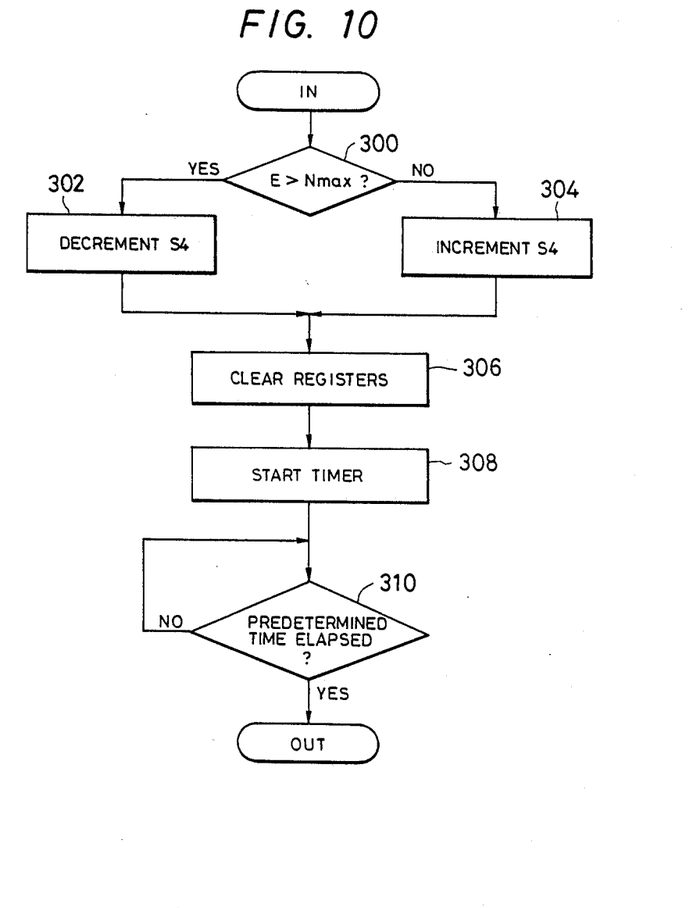

FIGS. 9A and 9B are a flow chart showing operation of the microcomputer 3 in the second or third embodiment, in which steps corresponding to those in FIGS. 5A and 5B are marked with the identical numerals and the detailed description thereof will be omitted. In FIGS. 9A and 9B, steps 104, 106, 114, 116, 132 and 134 are added. In each of the steps 104, 114 and 132, the focus voltage E read in each preceding step is checked to determine whether the focus voltage is within the predetermined range between Nmin and Nmax. If the decision is "YES", control goes to the step 108, 118 or 136. If the decision is "NO", control goes to the step 106, 116 or 134. The steps 106, 116 and 134 are identical to each other and are shown as a subroutine in FIG. 10, in which a step 300 is first executed to check whether the read focus voltage E is larger than Nmax. Dependent on whether the decision in the step 300 is "YES" or "NO", control goes to a step 302 or 304 to change the control signal S4 by one step to decrease or increase the gain of the gain control circuit 15, respectively. Then, the registers A1, B1, A2 and B2 are cleared in a step 306. Control advances to a step 308 to start a timer and then to a step 310 to check whether a predetermined time period is elapsed. The predetermined time period may be set to a time period necessary to settle the transition response caused by the stepwise variation of the gain, for example, to 2 to 3 times of the sampling interval of the focus voltage (about 30 to 50 msec). After the predetermined time period is elapsed, the control returns to the steps 102 or 128.

It should be noted that in the case of the second embodiment the reference voltages SEn compared in the steps 108, 118 and 136 are varied in accordance with the control signal S4 at the time of the comparison. On the other hand, in the case of the third embodiment, the focus voltage E compared in the steps 108, 118 and 138 is amplified (multiplied) in accordance with the control signal S4 in advance of the comparison.

It should be understood that the foregoing relates to only preferred embodiments of the present invention, and that it is not intended to cover all changes and modifications of the embodiments of this invention herein used for the purposes of the disclosure, which do not constitute departures from the spirit and scope of the invention.

What is claimed is:

1. An automatic focusing system including a focusing lens system and an image pickup device for converting a light beam incident thereon from an object through said focusing lens system into a corresponding electrical signal, comprising:

filter means coupled to said image pickup device for deriving a predetermined high-frequency component from said electrical signal;

detector means coupled to said filter means for detecting a focus voltage of the derived predetermined high-frequency component, the level of said focus voltage varying in accordance with the position of said focusing lens system so as to be at a maximum when said focusing lens system takes a focus position where the light beam from said object is focused on said image pickup device, the detector means including means for successively sampling and digitizing the focus voltage to output a series of sampled focus data: p1 drive means for driving said focusing lens system in directions along its optical axis;

means for successively generating a series of lens position data which represent positions of the focusing lens system at times when the focus voltage is sampled; and control means for successively comparing the series of focus data with a plurality of reference voltages which are different from each other and are stepped in value to select the focus data which are substantially equal to corresponding reference voltages, sequentially storing the reference values corresponding to the selected focus data together with the lens position data corresponding to the selected focus data, comparing each of the stored reference values with the subsequently stored reference value to find out the consecutively stored two reference values which are equal to each other or the consecutively stored three reference values among which the secondarily stored reference value is maximum, and causing the drive means to adjust the position of the focus lens system to a middle between two positions represented by the two lens position data respectively stored together with the consecutively stored two reference values when the consecutively stored two reference values are equal to each other, and to a middle position among three positions represented by the three lens position data respectively stored together with the consecutively stored three reference values when the secondarily stored reference value is maximum among the consecutively stored three reference values.

2. An automatic focusing system as claimed in claim 1, further comprising gain control circuit means which is provided between said filter means and said detector means and which is arranged so that its gain is controlled stepwise to be decreased by a predetermined value in accordance with a gain control signal from said control means whereby the focus voltage is kept in a predetermined range, and wherein said control means controls the difference in level between the plurality of reference values so as to be varied stepwise in accordance with the amount of the gain determined in the gain control.

3. An automatic focusing system as claimed in claim 1, further comprising gain control circuit means which is provided between said filter means and said detector means and which is arranged so that its gain is controlled stepwise to be decreased by a predetermined value in accordance with a gain control signal from said control means whereby the focus voltage is kept in a predetermined range, and wherein said control means amplifies the focus data so that the amplification degree is determined in accordance with the amount of the gain in the gain control.

* * * * *